United States Patent
Pfaller et al.

(10) Patent No.: US 12,304,015 B2
(45) Date of Patent: May 20, 2025

(54) SYSTEMS AND METHODS TO PROVIDE VISUAL ASSISTANCE FOR SELECTION OF WELDING PARAMETERS

(71) Applicant: Illinois Tool Works Inc., Glenview, IL (US)

(72) Inventors: Andrew Pfaller, Hilbert, WI (US); Scott Rozmarynowski, Greenville, WI (US)

(73) Assignee: Illinois Tool Works Inc., Glenview, IL (US)

( * ) Notice: Subject to any disclaimer, the term of this patent is extended or adjusted under 35 U.S.C. 154(b) by 806 days.

(21) Appl. No.: 17/507,425

(22) Filed: Oct. 21, 2021

(65) Prior Publication Data

US 2022/0126389 A1    Apr. 28, 2022

Related U.S. Application Data

(60) Provisional application No. 63/106,658, filed on Oct. 28, 2020.

(51) Int. Cl.
*B23K 9/10* (2006.01)
*B23K 9/09* (2006.01)
*B23K 9/095* (2006.01)

(52) U.S. Cl.
CPC ............ *B23K 9/1087* (2013.01); *B23K 9/091* (2013.01); *B23K 9/0953* (2013.01); *B23K 9/1062* (2013.01)

(58) Field of Classification Search
CPC ...... B23K 9/095; B23K 9/0953; B23K 9/091; B23K 9/1006; B23K 9/1062; B23K 9/1087
See application file for complete search history.

(56) References Cited

U.S. PATENT DOCUMENTS

| | | |
|---|---|---|
| 7,781,700 B2 | 8/2010 | Harris |
| 10,747,393 B2 | 8/2020 | Albrecht et al. |

(Continued)

FOREIGN PATENT DOCUMENTS

WO    2012006581    1/2012

OTHER PUBLICATIONS

European Examination Appln No. 21204658.5 dated Jun. 16, 2023.

(Continued)

*Primary Examiner* — Brian W Jennison
(74) *Attorney, Agent, or Firm* — McAndrews, Held & Malloy, Ltd.

(57) ABSTRACT

An example welding-type system includes: power conversion circuitry configured to convert input power to welding-type power; an interface configured to: receive a selection of a parameter from a plurality of parameters; and receive a selection of a value for the selected parameter; and control circuitry configured to: in response to the selection of the parameter from the plurality of parameters, control the interface to output a visual indication of an effect of changing the parameter on at least one of a welding electrode, a quantity of discontinuities in the weld, a magnitude of a discontinuity in the weld, or a quantity of inclusions in the weld; in response to a change in the value of the selected parameter via the interface, control the interface to change the visual indication of the effect based on the change in the value; and control the power conversion circuitry based on the value.

20 Claims, 4 Drawing Sheets

(56) References Cited

U.S. PATENT DOCUMENTS

| | | | |
|---|---|---|---|
| 2009/0071949 A1* | 3/2009 | Harris ................. | B23K 9/1006 |
| | | | 219/130.1 |
| 2012/0006800 A1 | 1/2012 | Ryan et al. | |
| 2018/0333798 A1 | 11/2018 | Uecker | |
| 2020/0301568 A1* | 9/2020 | Albright ............. | B23K 9/0953 |

OTHER PUBLICATIONS

Inspection Best Practices, Understanding Weld Discontinuities, Excerpted from AWS B1.10:1999, Guide for the Nondestructive Examination of Welds, Fall 2006 (2 pgs.).
European Office Communication with extended European Search Report Appln No. 21204658.5 dated Jun. 7, 2022.
Canadian Office Action Appln No. 3,135,882 dated Oct. 13, 2023.
Canadian Office Action Appln No. 3,135,882 dated Aug. 26, 2024.

* cited by examiner

SYSTEMS AND METHODS TO PROVIDE VISUAL ASSISTANCE FOR SELECTION OF WELDING PARAMETERS

BACKGROUND

The present application claims the benefit of U.S. Provisional Patent Application Ser. No. 63/106,658, filed Oct. 28, 2020, entitled "SYSTEMS AND METHODS TO PROVIDE VISUAL ASSISTANCE FOR SELECTION OF WELDING PARAMETERS." The entirety of U.S. Provisional Patent Application Ser. No. 63/106,658 is expressly incorporated herein by reference.

BACKGROUND

This disclosure relates generally to user interfaces for welding-type systems and, more particularly, to systems and methods to provide visual assistance for selection of welding parameters.

SUMMARY

Systems and methods to provide visual assistance for selection of welding parameters are disclosed, substantially as illustrated by and described in connection with at least one of the figures, as set forth more completely in the claims.

BRIEF DESCRIPTION OF THE DRAWINGS

The figures are not to scale. Where appropriate, the same or similar reference numerals are used in the figures to refer to similar or identical elements.

DETAILED DESCRIPTION

Figure 1:
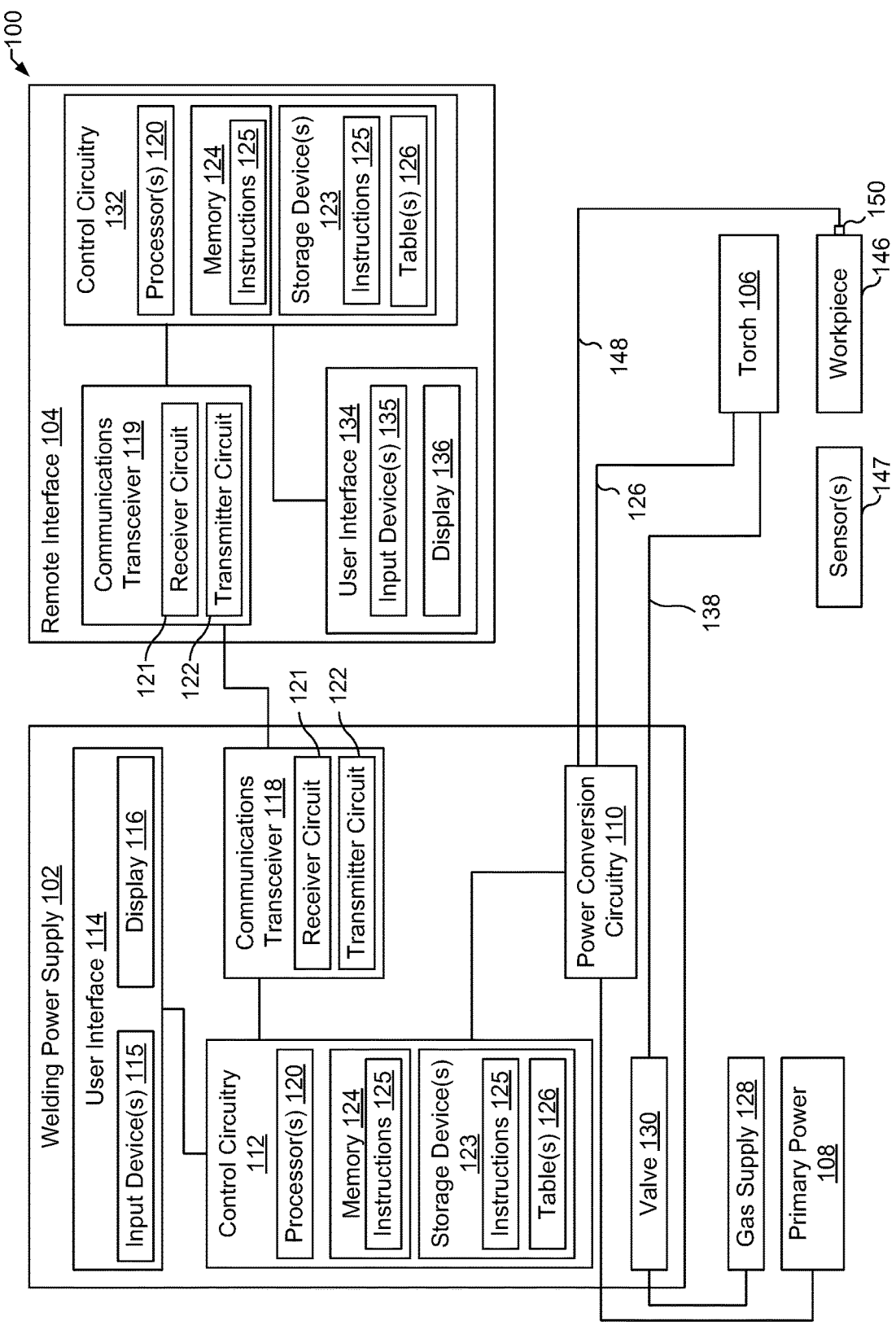
FIG. 1 is a schematic diagram of an example welding system including a welding-type power supply configured to output welding-type power, in accordance with aspects of this disclosure.

Gas tungsten arc welding (GTAW), also referred to as TIG welding, enable weld operators to use cyclic waveforms that repeat based on a selected frequency and/or non-cyclic waveforms that occur based on the selected frequency. For example, an operator may select a frequency of an AC waveform and/or a number of pulses per second for an AC or DC pulse waveform (referred to herein as the "frequency" of the DC pulse waveform). Conventional welding-type power supplies enable operators to select the frequency within the capabilities of the welding-type power supply. However, in many instances users do not understand how to set welding parameters at the most appropriate values for a given welding task.

Disclosed example system and methods provide visualizations of the effects of the different parameters on the weld and/or welding zone, which improves the ability for welders to successfully weld (e.g., reduce or minimize defects, improve weld strength). While conventional welding interfaces illustrate effects of certain weld parameters on the weld penetration or weld bead shape, these but there are several other characteristics taken into account by disclosed systems and methods to further improve the operator's understanding of welding parameters. For example, when AC TIG welding on aluminum, an AC balance that is higher than a typical value may result in visible black oxide islands being observable on the surface of the weld puddle. Conversely, an AC balance setting that is lower than a typical value may cause the geometry of the tungsten electrode to degrade and form a ball on the end, which can in poor directional control of the arc. Disclosed example systems and methods display visual indications of effect(s) of changing welding parameter(s) on one or more of a welding electrode, a quantity of discontinuities in the weld, a magnitude of one or more discontinuities in the weld, and/or quantities of inclusions in the weld.

As used herein, the term "discontinuity" refers to an interruption of a typical structure of a material, such as a lack of homogeneity in its mechanical, metallurgical or physical characteristics. A discontinuity is not necessarily a defect. As used herein, the term "inclusion" refers to foreign material that become trapped in the weld, such as pieces of slag, flux, tungsten, oxide, and/or other foreign material. Inclusions are considered to be a type of discontinuity.

As used herein, "amperage" refers to an amount of welding-type current, and may include an instantaneous current, an average current, an RMS current, a peak current, an electrode negative (EN) current, and/or an electrode positive (EP) current.

As used herein, "power conversion circuitry" and/or "power conversion circuits" refer to circuitry and/or electrical components that convert electrical power from one or more first forms (e.g., power output by a generator) to one or more second forms having any combination of voltage, current, frequency, and/or response characteristics. The power conversion circuitry may include power limiting circuitry, output selection circuitry, measurement and/or control circuitry, and/or any other circuits to provide appropriate features.

As used herein, the terms "first" and "second" may be used to enumerate different components or elements of the same type, and do not necessarily imply any particular order. For example, while in some examples a first time occurs prior to a second time within a time period, the terms "first time" and "second time" do not imply any specific order in which the first or second times occur relative to the other within the time period.

The term "welding-type system," as used herein, includes any device capable of supplying power suitable for welding, plasma cutting, induction heating, Carbon Arc Cutting-Air (e.g., CAC-A) and/or hot wire welding/preheating (including laser welding and laser cladding), including inverters, converters, choppers, resonant power supplies, quasi-resonant power supplies, etc., as well as control circuitry and other ancillary circuitry associated therewith.

As used herein, the term "welding-type power" refers to power suitable for welding, plasma cutting, induction heating, CAC-A and/or hot wire welding/preheating (including laser welding and laser cladding). As used herein, the term "welding-type power supply" and/or "power supply" refers to any device capable of, when power is applied thereto, supplying welding, plasma cutting, induction heating, CAC-A and/or hot wire welding/preheating (including laser welding and laser cladding) power, including but not limited to inverters, converters, resonant power supplies, quasi-resonant power supplies, and the like, as well as control circuitry and other ancillary circuitry associated therewith.

As used herein, a "circuit," or "circuitry," includes any analog and/or digital components, power and/or control elements, such as a microprocessor, digital signal processor (DSP), software, and the like, discrete and/or integrated components, or portions and/or combinations thereof.

The terms "control circuit," "control circuitry," and/or "controller," as used herein, may include digital and/or analog circuitry, discrete and/or integrated circuitry, microprocessors, digital signal processors (DSPs), and/or other logic circuitry, and/or associated software, hardware, and/or firmware. Control circuits or control circuitry may be located on one or more circuit boards that form part or all of a controller, and are used to control a welding process, a device such as a power source or wire feeder, and/or any other type of welding-related system.

As used herein, the term "memory" includes volatile and non-volatile memory devices and/or other storage device.

As used herein, the term "torch," "welding torch," "welding tool" or "welding-type tool" refers to a device configured to be manipulated to perform a welding-related task, and can include a hand-held welding torch, robotic welding torch, gun, gouging tool, cutting tool, or other device used to create the welding arc.

As used herein, the term "welding mode," "welding process," "welding-type process" or "welding operation" refers to the type of process or output used, such as current-controlled (CC), voltage-controlled (CV), pulsed, gas metal arc welding (GMAW), flux-cored arc welding (FCAW), gas tungsten arc welding (GTAW, e.g., TIG), shielded metal arc welding (SMAW), spray, short circuit, CAC-A, gouging process, cutting process, and/or any other type of welding process.

Disclosed example welding-type systems include: power conversion circuitry configured to convert input power to welding-type power; an interface configured to: receive a selection of a parameter from a plurality of parameters; and receive a selection of a value for the selected parameter; and control circuitry configured to: in response to the selection of the parameter from the plurality of parameters, control the interface to output a visual indication of an effect of changing the parameter on at least one of a welding electrode, a quantity of discontinuities in the weld, a magnitude of a discontinuity in the weld, or a quantity of inclusions in the weld; in response to a change in the value of the selected parameter via the interface, control the interface to change the visual indication of the effect based on the change in the value; and control the power conversion circuitry based on the value of the selected parameter.

In some example welding-type systems, the selected parameter is one of: a welding mode, a welding polarity, a tungsten electrode diameter, a tungsten electrode stickout length, a gas cup size, a shielding gas flow rate, a torch angle, an amperage setting, an AC balance, an AC frequency, a mixed AC-DC welding ratio, an AC waveshape, an AC commutation level, an EN amperage of an AC waveform, an EP amperage of the AC waveform, an amperage ratio of an AC waveform, a pulse frequency, a pulse peak phase time, a pulse background phase amperage, a pulse background percentage of a pulse cycle, a pulse waveform, a pulse transition rate, a pulse-on-pulse setting, or a pulse-on-pulse ratio.

In some example welding-type systems, the visual indication of the effect is based on one or more of: a material type of a workpiece being welded, a weld joint configuration, or a welding position. In some example welding-type systems, the visual indication of the effect is based on one or more other parameters, different than the selected parameter. In some example welding-type systems, the one or more other parameters include at least one of: the welding mode, the welding polarity, the tungsten electrode diameter, the tungsten electrode stickout length, the gas cup size, the shielding gas flow rate, the torch angle, an amperage setting, the AC balance, the AC frequency, the mixed AC-DC welding ratio, the AC waveshape, the AC commutation level, the EN amperage of the AC waveform, the EP amperage of the AC waveform, the amperage ratio of the AC waveform, the pulse frequency, the pulse peak phase time, the pulse background phase amperage, the pulse background percentage of the pulse cycle, the pulse waveform, the pulse transition rate, the pulse-on-pulse setting, or the pulse-on-pulse ratio.

In some example welding-type systems, the visual indication includes a graphic and/or text. In some example welding-type systems, the selected parameter is one of a travel speed, a weave pattern, a travel angle, a work angle, a tungsten to work distance, a wire feed speed, a wire preheating power, a wire preheating voltage, a wire preheating current, a wire preheating enthalpy, a wire oscillation speed, a wire oscillation pattern, a wire feed location relative to a weld puddle, or a wire feed orientation relative to the weld puddle. In some example welding-type systems, the control circuitry is configured to control the power conversion circuitry to output the welding-type power to have at least one of an alternating current (AC) waveform or a pulse waveform. In some example welding-type systems, the interface includes a remote interface in communication with the power supply.

Disclosed example welding interfaces include: a display; one or more input devices configured to: receive a selection of a parameter from a plurality of parameters; and receive a selection of a value for the selected parameter; and control circuitry configured to: in response to the selection of the parameter from the plurality of parameters, control the display to output a visual indication of an effect of changing the parameter on at least one of a welding electrode, a quantity of discontinuities in the weld, a magnitude of a discontinuity in the weld, or a quantity of inclusions in the weld; and in response to a change in the value of the selected parameter via the one or more input devices, control the display to change the visual indication of the effect based on the change in the value.

In some example welding interfaces, the selected parameter is one of: a welding mode, a welding polarity, a tungsten electrode diameter, a tungsten electrode stickout length, a gas cup size, a shielding gas flow rate, a torch angle, an amperage setting, an AC balance, an AC frequency, a mixed AC-DC welding ratio, an AC waveshape, an AC commutation level, an EN amperage of an AC waveform, an EP amperage of the AC waveform, an amperage ratio of an AC waveform, a pulse frequency, a pulse peak phase time, a pulse background phase amperage, a pulse background percentage of a pulse cycle, a pulse waveform, a pulse transition rate, a pulse-on-pulse setting, or a pulse-on-pulse ratio. In some example welding interfaces, the visual indication of the effect is based on one or more of: a material type of a workpiece being welded, a weld joint configuration, or a welding position. In some example welding interfaces, the visual indication of the effect is based on one or more other parameters, different than the selected parameter.

In some example welding interfaces, the one or more other parameters include at least one of: the welding mode, the welding polarity, the tungsten electrode diameter, the tungsten electrode stickout length, the gas cup size, the shielding gas flow rate, the torch angle, an amperage setting, the AC balance, the AC frequency, the mixed AC-DC welding ratio, the AC waveshape, the AC commutation level, the EN amperage of the AC waveform, the EP amperage of the AC waveform, the amperage ratio of the AC waveform, the pulse frequency, the pulse peak phase time, the pulse background phase amperage, the pulse background percentage of the pulse cycle, the pulse waveform, the pulse transition rate, the pulse-on-pulse setting, or the pulse-on-pulse ratio.

In some example welding interfaces, the visual indication includes a graphic and/or text. In some example welding interfaces, the selected parameter is one of a travel speed, a weave pattern, a travel angle, a work angle, a tungsten to work distance, a wire feed speed, a wire preheating power, a wire preheating voltage, a wire preheating current, a wire preheating enthalpy, a wire oscillation speed, a wire oscillation pattern, a wire feed location relative to a weld puddle, or a wire feed orientation relative to the weld puddle. Some example welding interfaces further include a communications transceiver configured to transmit the value of the selected parameter to a welding power supply.

Disclosed example methods involve: receiving a selection of a parameter from a plurality of parameters of the AC waveform or the pulse waveform; in response to the selection of the parameter from the plurality of parameters, outputting a visual indication of an effect of changing the parameter on at least one of a welding electrode, a quantity of discontinuities in the weld, a magnitude of a discontinuity in the weld, or a quantity of inclusions in the weld; receiving a change in a value for the selected parameter; and in response to the change in the value of the selected parameter, change the visual indication of the effect based on the change in the value; and controlling the power conversion circuitry to convert input power to welding-type power based on the value of the selected parameter.

Turning now to the drawings, FIG. 1A is a block diagram of an example welding system 100 having a welding-type power supply 102, a remote interface 104, and a welding torch 106. The welding system 100 powers, controls, and/or supplies consumables to a welding application. In the example of FIG. 1, the power supply 102 directly supplies welding-type output power to the welding torch 106. The welding torch 106 is configured for gas tungsten arc welding (GTAW), which may be used to perform welding processes involving DC welding-type current, pulsed DC welding-type current waveforms, and/or AC waveforms. Example DC pulse waveforms that may be output by the power supply 102 have a peak phase at a peak current and a background phase at a background current, and one pulse cycle includes one peak phase and one background phase.

The power supply 102 receives primary power 108 (e.g., from the AC power grid, an engine/generator set, a battery, or other energy generating or storage devices, or a combination thereof), conditions the primary power, and provides an output power to one or more welding devices in accordance with demands of the system 100. The primary power 108 may be supplied from an offsite location (e.g., the primary power may originate from the power grid). The power supply 102 includes power conversion circuitry 110, which may include transformers, rectifiers, switches, and so forth, capable of converting the AC input power to AC and/or DC output power as dictated by the demands of the system 100 (e.g., particular welding processes and regimes). The power conversion circuitry 110 converts input power (e.g., the primary power 108) to welding-type power based on a target amperage (e.g., a weld current setpoint) and outputs the welding-type power via a weld circuit.

The power supply 102 includes control circuitry 112 to control the operation of the power supply 102. The power supply 102 also includes a user interface 114. The control circuitry 112 receives input from the user interface 114, through which a user may choose a process and/or input desired parameters (e.g., a voltage, a current, a frequency, pulse peak current time, a pulse peak current percentage, a pulse background current time, a pulse background current percentage, an AC waveform type, an AC balance, a weld circuit inductance, etc.). The user interface 114 may receive inputs using one or more input devices 115, such as via a keypad, keyboard, physical buttons, switches, knobs, a mouse, a keyboard, a keypad, a touch screen (e.g., software buttons), a voice activation system, a wireless device, etc. Furthermore, the control circuitry 112 controls operating parameters based on input by the user as well as based on other current operating parameters. Specifically, the user interface 114 may include a display 116 for presenting, showing, or indicating, information to an operator.

Similarly, the example remote interface 104 may include a user interface 134 having one or more input device(s) 135 and a display 136. The user interface 134, the input device(s) 135, and/or the display 136 may be similar, identical, or different than the user interface 114, the input device(s) 115, and/or the display 116.

The control circuitry 112 may also include interface circuitry for communicating data to other devices in the system 100, such as the remote interface 104. For example, in some situations, the power supply 102 wirelessly communicates with the remote interface 104. Further, in some situations, the power supply 102 communicates with the remote interface 104 using a wired connection, such as by using a network interface controller (NIC) to communicate data via a network (e.g., ETHERNET, 10baseT, 10base100, etc.), and/or. In some examples, the control circuitry 112 communicates with the remote interface 104 via the weld circuit.

The control circuitry 112 includes at least one controller or processor 120 that controls the operations of the power supply 102. The control circuitry 112 receives and processes multiple inputs associated with the performance and demands of the system 100. The processor 120 may include one or more microprocessors, such as one or more "general-purpose" microprocessors, one or more special-purpose microprocessors and/or ASICS, and/or any other type of processing device. For example, the processor 120 may include one or more digital signal processors (DSPs).

The example control circuitry 112 includes one or more storage device(s) 123 and one or more memory device(s) 124. The storage device(s) 123 (e.g., nonvolatile storage) may include ROM, flash memory, a hard drive, and/or any other suitable optical, magnetic, and/or solid-state storage medium, and/or a combination thereof. The storage device 123 stores data (e.g., data corresponding to a welding application), instructions (e.g., software or firmware to perform welding processes), and/or any other appropriate data. Examples of stored data for a welding application include predetermined relationships between 1) parameter values and/or combinations of parameter values, and 2) effects on a welding electrode, a quantity of discontinuities in the weld, a magnitude of a discontinuity in the weld, a quantity of inclusions in the weld, and/or other effects, such as one or more look up tables, as described in more detail below.

The memory device 124 may include a volatile memory, such as random access memory (RAM), and/or a nonvolatile memory, such as read-only memory (ROM). The memory device 124 and/or the storage device(s) 123 may store a variety of information and may be used for various purposes. For example, the memory device 124 and/or the storage device(s) 123 may store processor executable instructions 125 (e.g., firmware or software) for the processor 120 to execute. In addition, one or more control regimes for various welding processes, along with associated settings and parameters, may be stored in the storage device 123 and/or memory device 124.

In some examples, a gas supply 128 provides shielding gases, such as argon, helium, carbon dioxide, and so forth, depending upon the welding application. The shielding gas flows to a valve 130, which controls the flow of gas, and if desired, may be selected to allow for modulating or regulating the amount of gas supplied to a welding application. The valve 130 may be opened, closed, or otherwise operated by the control circuitry 112 to enable, inhibit, or control gas flow (e.g., shielding gas) through the valve 130. Shielding gas exits the valve 130 and flows through a cable 138 (which in some implementations may be packaged with the welding power output) to the welding torch 106, which provides the shielding gas to the welding application. In some examples, the welding system 100 does not include the gas supply 128, the valve 130, and/or the cable 138.

In the example of FIG. 1, the power supply 102 includes a communications transceiver 118, and the remote interface 104 includes a communications transceiver 119. The communications transceivers 118, 119 each include a corresponding receiver circuit 121 and a corresponding transmitter circuit 122. The example communications transceivers 118, 119 enable the remote interface 104 to transmit commands to the power supply 102 and/or receive information from the power supply 102. Example commands may include commands to set parameters and/or otherwise configure the power supply 102. The remote interface 104 may receive information about the configuration of the power supply 102.

The remote interface 104 further includes control circuitry 132, which may include one or more processor(s) 120, one or more storage device(s) 123, and/or memory 124, and/or may store and execute machine readable instructions 125. The control circuitry 132, the processor(s) 120, the storage device(s) 123, and/or the memory 124 may be similar, identical, or different than the control circuitry 112, the processor(s) 120, the storage device(s) 123, and/or the memory 124 of the power supply 102.

The welding torch 106 delivers the welding power and/or shielding gas for a welding application. The welding torch 106 is used to establish a welding arc between the welding torch 106 and a workpiece 146. A welding cable 140 couples the torch 106 to the power conversion circuitry 110 to conduct current to the torch 106. A work cable 148 couples the workpiece 146 to the power supply 102 (e.g., to the power conversion circuitry 110) to provide a return path for the weld current (e.g., as part of the weld circuit). The example work cable 148 is attachable and/or detachable from the power supply 102 for ease of replacement of the work cable 148. The work cable 148 may be terminated with a clamp 150 (or another power connecting device), which couples the power supply 102 to the workpiece 146.

In some examples, one or more sensors 147 are included with or connected to the welding torch 106 to monitor one or more welding parameters (e.g., power, voltage, current, inductance, impedance, etc.) to inform the control circuitry 132 and/or 112 during the welding process.

To aid a weld operator in configuring the welding-type power supply 102 appropriately (e.g., welding parameters) for an AC waveform or DC pulse process, the example storage device(s) 123 may store tables 126 or other data representative of relationships between parameters and/or effects on a welding electrode, a quantity of discontinuities in the weld, a magnitude of a discontinuity in the weld, a quantity of inclusions in the weld, and/or other effects. The example tables 126 may be populated based on empirical testing using different combinations of welding parameters.

Figure 2A:
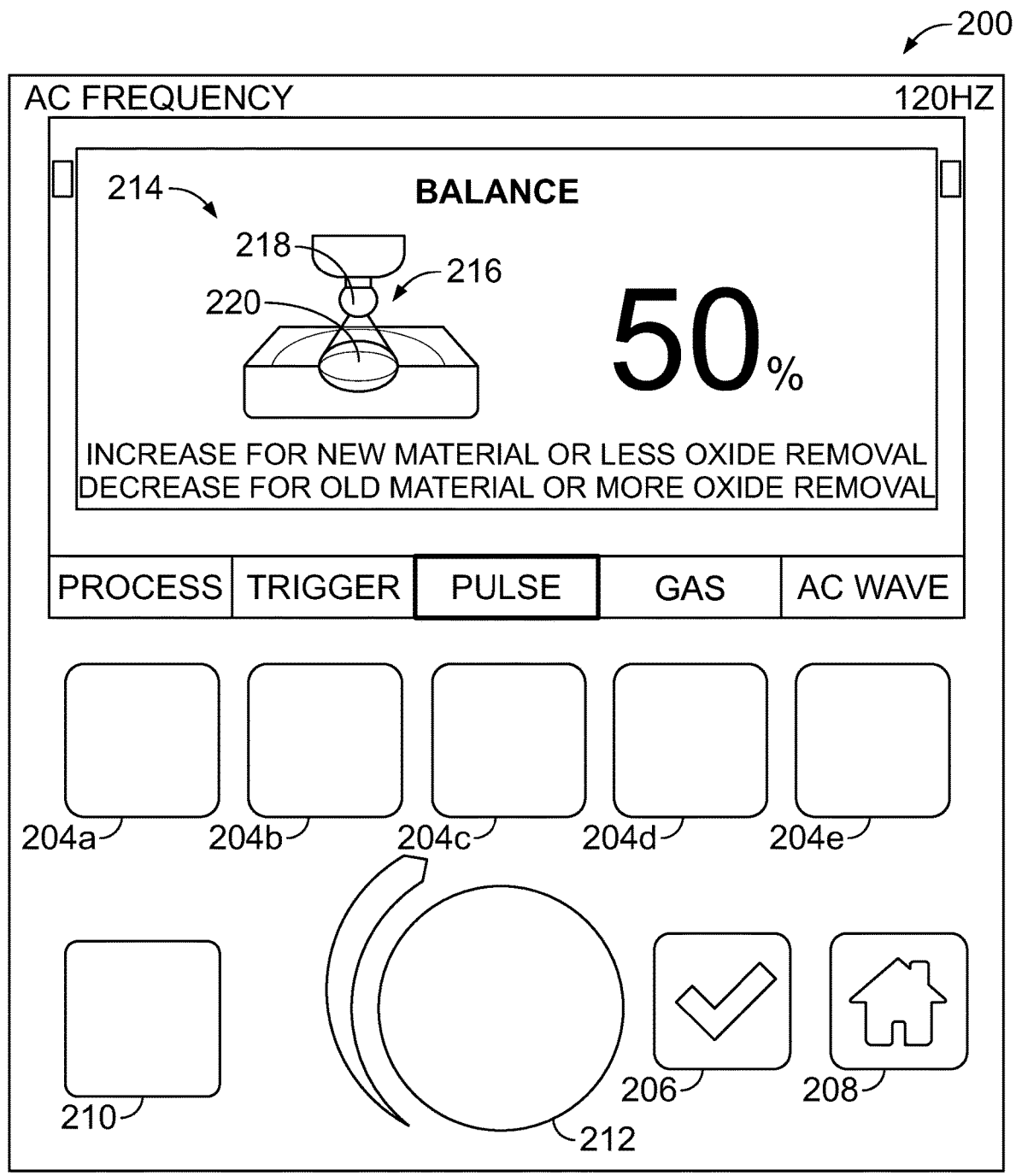
FIG. 2A is an example user interface that may implement the user interface of FIG. 1 to enable an operator to adjust one or more parameters of a welding-type output waveform, and/or to output a visual indication of the effects of the selected parameter and/or selected value on one or more of a welding electrode, a quantity of discontinuities in the weld, a magnitude of a discontinuity in the weld, and/or a quantity of inclusions in the weld.
Figure 2B:
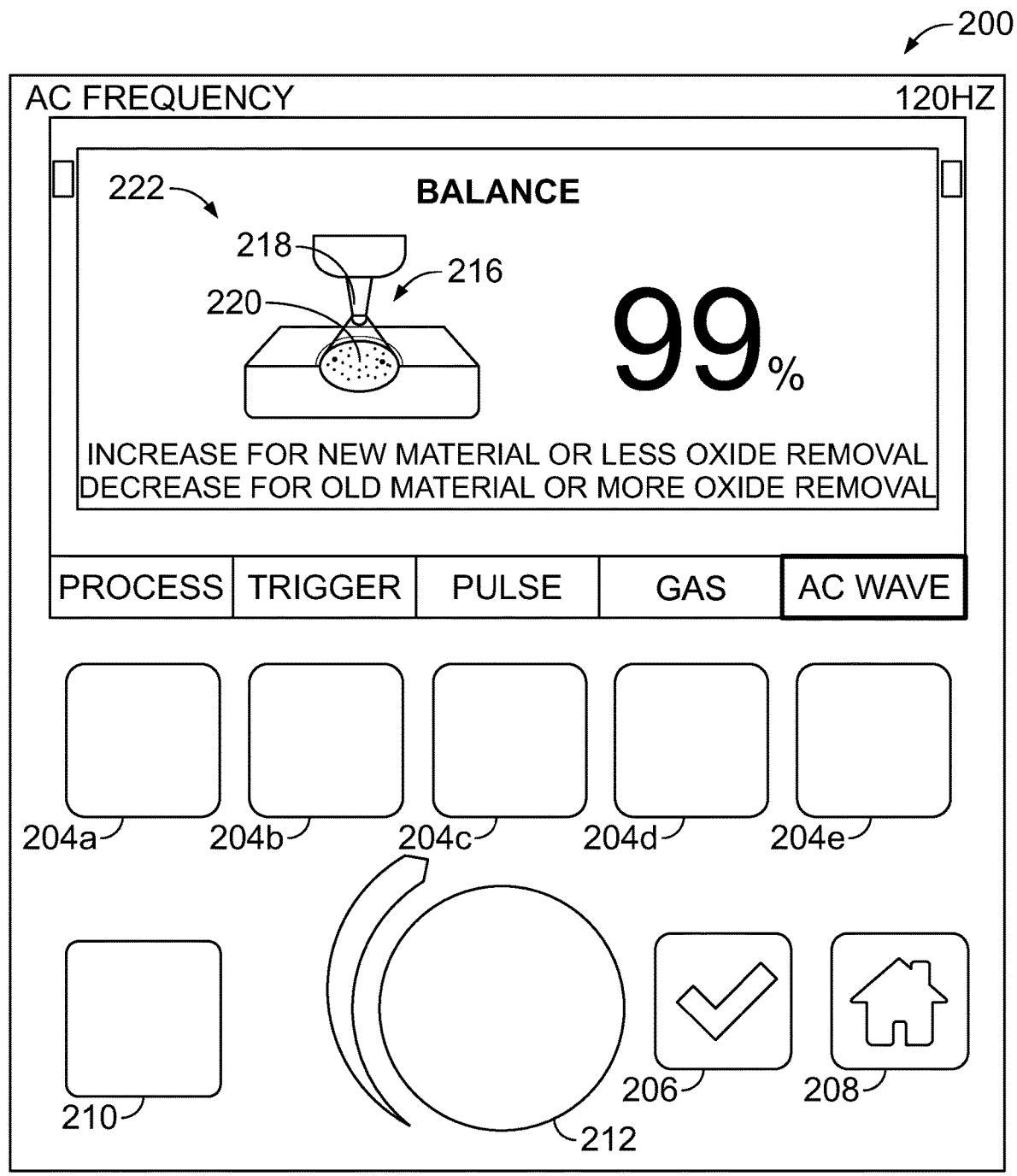
FIG. 2B illustrates the example user interface of FIG. 2A illustrating an updated visual representation in response to a change in the parameter.

FIG. 2A is an example user interface 200 that may implement the user interface 114, 134 of FIG. 1 to enable an operator to adjust one or more parameters of a welding-type output waveform, and/or to output a visual indication of the effects of the selected parameter and/or selected value on one or more of a welding electrode, a quantity of discontinuities in the weld, a magnitude of a discontinuity in the weld, and/or a quantity of inclusions in the weld. FIG. 2B illustrates the example user interface 200 of FIG. 2A illustrating an updated visual representation in response to a change in the parameter. The example user interface 200 of FIGS. 2A and 2B includes a display 202, input buttons 204a-204e, 206, 208, 210, and an input knob 212. The example buttons 204a-204e, 206, 208, 210, and the input knob 212 may implement the input devices 115, 135 of FIG. 1.

The example buttons 204a-204e enable an operator to select one or more weld parameters for adjustment or recall (e.g., by recalling a weld schedule or stored set of parameters). Once a parameter is selected, the example knob 212 receives inputs to change the value of the parameter, such as by increasing (e.g., incrementing) or decreasing (e.g., decrementing) a value of a parameter and/or selecting between discrete values of a parameter. For example, an operator may turn the knob 212 to select an AC waveform or a DC pulse process, to change a welding amperage, change an AC balance, and/or to change any other parameters.

The button 208 may be selected to confirm a selected parameter. The button 208 enables navigation, such as by canceling a parameter change and/or reverting to a prior menu.

The example button 210 may be selected to enable or disable an automatic configuration mode, in which the control circuitry 112, 132 automatically configures one or more parameters in response to changes in one or more other parameters. For example, when the automatic configuration mode is selected, the control circuitry 112, 132 may respond to changes in an amperage parameter (e.g., received via the knob 212) with corresponding changes to a frequency for AC and/or DC pulse processes. The operator may be permitted to change the parameter from the automatically configured value, or may be prevented from making changes to an automatically configured value without disabling the automatic configuration mode.

In the example of FIG. 2A, the display 202 presents a visual indication, such as a graphic 214, that indicates an effect of the selected parameter and/or the selected value of a parameter (e.g., the AC balance of an AC waveform and/or a pulse waveform). The graphic 214 may illustrate the effects of changing a parameter on one or more of a welding electrode (e.g., the electrode shape and/or degradation), a quantity of discontinuities in the weld, a magnitude of a discontinuity in the weld, or a quantity of inclusions in the weld. Example parameters that may affect the welding electrode, the quantity and/or magnitude of discontinuities, and/or inclusions include, without limitation: a welding mode, a welding polarity, a tungsten electrode diameter, a tungsten electrode stickout length, a gas cup size, a shielding gas flow rate, a torch angle, an amperage setting, an AC balance, an AC frequency, a mixed AC-DC welding ratio, an AC waveshape, an AC commutation level, an EN amperage of an AC waveform, an EP amperage of the AC waveform, an amperage ratio of an AC waveform, a pulse frequency, a pulse peak phase time, a pulse background phase amperage, a pulse background percentage of a pulse cycle, a pulse waveform, a pulse transition rate, a pulse-on-pulse setting, and/or a pulse-on-pulse ratio. In some examples, such as applications involving robotic control of the welding torch, additional parameters that may be considered include a travel speed, a weave pattern, a travel angle, a work angle, a tungsten to work distance, a wire feed speed, a wire preheating power, a wire preheating voltage, a wire preheating current, a wire preheating enthalpy, a wire oscillation speed, a wire oscillation pattern, a wire feed location relative to a weld puddle, or a wire feed orientation relative to the weld puddle.

When determining the visual indication, the control circuitry 112, 132 may use the parameter value by itself and/or in combination with the value(s) of one or more other parameters. Because of the dynamic nature of welding, the visual representation may be a relative representation, rather than illustrating the exact amount and/or magnitude of anticipated discontinuities and/or inclusions, and/or an exact amount of electrode degradation.

In the example interface 200, the graphic 214 illustrates an effect (e.g., a relative effect) of the selected value (50%) of the selected AC balance parameter. For example, higher values of the AC balance (e.g., more time in EP polarity relative to time in EN polarity) increase the likelihood and/or quantity of oxide inclusions in the resulting weld, subject to the condition of the workpiece at the time of welding. Conversely, lower values of the AC balance increase the removal of oxide from the workpiece and reduce oxide inclusions, but degrades the shape of the tungsten electrode in the torch 106. FIG. 2A illustrates the graphic 214 with a relatively lower value of the AC balance (e.g., 50%), resulting in a more rounded shape on the tip 216 of the tungsten electrode 218 and fewer (or no) oxide inclusions illustrated in a weld puddle 220, which are representative of the effects of the lower value of the AC balance. FIG. 2B illustrates an updated graphic 222 with a relatively higher value of the AC balance (e.g., 99%), resulting in a less rounded (e.g., less degraded) shape on the tip 216 of the tungsten electrode 218 and more oxide inclusions illustrated in the weld puddle 220, which are representative of the effects of the higher value of the AC balance.

In addition to the graphic 214, the example display 202 may also display the selected value of the parameter alphanumerically, and/or may display information to guide the operator to make changes to the selected value (e.g., increase parameter for thinner materials, decrease parameter for thicker materials).

Figure 3:
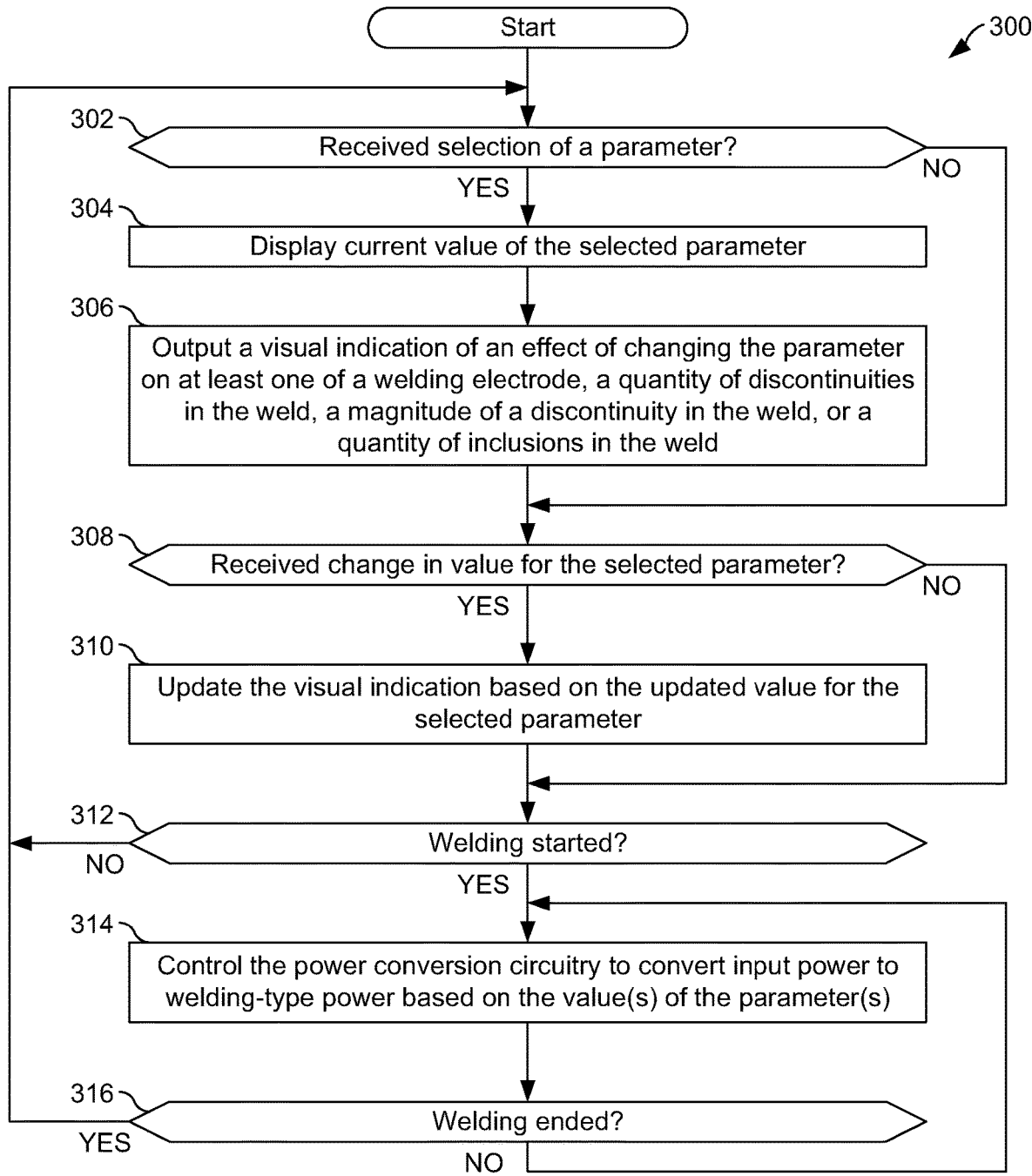
FIG. 3 is a flowchart illustrating example machine readable instructions which may be executed by the welding-type power supply of FIG. 1 to output a visual indication of the effects of the selected parameter and/or selected value.

FIG. 3 is a flowchart illustrating example machine readable instructions 300 which may be executed by the welding-type power supply 102 and/or the remote interface 104 of FIG. 1 to output a visual indication of the effects of the selected parameter and/or selected value. The example instructions 300 are described below with reference to the power supply 102 and the interface 200 of FIGS. 2A and 2B.

At block 302, the control circuitry 112 determines whether a selection of a parameter has been received (e.g., via the user interface 200 of FIGS. 2A and 2B). For example, the user of the power supply 102 may select a parameter via the user interface 200 for adjustment. If a parameter has been selected (block 302), at block 304 the control circuitry 112 displays a current value of the selected parameter.

At block 306, the control circuitry 112 determines and outputs a visual indication of an effect of changing the parameter on at least one of a welding electrode, a quantity of discontinuities in the weld, a magnitude of a discontinuity in the weld, or a quantity of inclusions in the weld. For example, the control circuitry 112 may look up the effects of the value of the selected parameter in a look up table or algorithmically calculate one or more effects based on predetermined relationships between the parameter values and the effects. The effects may be based solely on the value of the parameter, or further based on current values of one or more other parameters in combination with the current value of the parameter. For example, amperage, frequency, and/or other parameters may enhance or diminish the effects of the AC balance parameter on discontinuities, inclusions, and/or the welding electrode.

Example parameters that may be selected (block 302) and/or used in combination with the selected parameter include a welding mode, a welding polarity, a tungsten electrode diameter, a tungsten electrode stickout length, a gas cup size, a shielding gas flow rate, a torch angle, an amperage setting, an AC balance, an AC frequency, a mixed AC-DC welding ratio, an AC waveshape, an AC commutation level, an EN amperage of an AC waveform, an EP amperage of the AC waveform, an amperage ratio of an AC waveform, a pulse frequency, a pulse peak phase time, a pulse background phase amperage, a pulse background percentage of a pulse cycle, a pulse waveform, a pulse transition rate, a pulse-on-pulse setting, or a pulse-on-pulse ratio. Additionally or alternatively, the parameters that may be selected and/or used in combination with the selected parameter, such as in robotic welding applications, may include a travel speed, a weave pattern, a travel angle, a work angle, a tungsten to work distance, a wire feed speed, a wire preheating power, a wire preheating voltage, a wire preheating current, a wire preheating enthalpy, a wire oscillation speed, a wire oscillation pattern, a wire feed location relative to a weld puddle, or a wire feed orientation relative to the weld puddle.

After outputting the visual indication (block 306), and/or if a selection of a parameter has not been received (block 302), at block 308 the control circuitry 112 determines whether a change in the value of a currently selected parameter has been received. For example, a user may adjust the value of a currently selected parameter via the knob 212 of FIGS. 2A and 2B and/or via another input device. If a change in the value of a currently selected parameter has been received (block 308), at block 310 the control circuitry 112 updates the visual indication (e.g., the graphics 214, 222) based on the updated value for the selected parameter.

After updating the visual indication (block 310), or if a change in the value of the parameter has not been received (block 308), at block 312 the control circuitry 112 determines whether welding has started. For example, the control circuitry 112 may detect an input device (e.g., a foot pedal), welding-type current being output from the power conversion circuitry, and/or an output voltage from the power conversion circuitry that is within a welding voltage range.

If welding has started (block 312), at block 314 the control circuitry 112 controls the power conversion circuitry 110 to convert input power to welding-type power based on the value(s) of the parameter(s). At block 316, the control circuitry 112 determines whether welding has ended. For example, the control circuitry 112 may determine whether the input device (e.g., the foot pedal) has been released, and/or whether the output voltage and/or output amperage indicate that the arc is no longer present. If welding has not ended (block 316), control returns to block 314 to continue controlling the power conversion circuitry 110.

When welding has ended (block 316) or welding is not started (block 312), control returns to block 302 to monitor for a change in the selected parameter(s) and/or changes in the value(s).

The present methods and systems may be realized in hardware, software, and/or a combination of hardware and software A typical combination of hardware and software may include one or more application specific integrated circuits and/or chips. Some implementations may comprise a non-transitory machine-readable (e.g., computer readable) medium (e.g., FLASH memory, optical disk, magnetic storage disk, or the like) having stored thereon one or more lines of code executable by a machine, thereby causing the machine to perform processes as described herein. As used herein, the term "non-transitory machine-readable medium" is defined to include all types of machine readable storage media and to exclude propagating signals.

As utilized herein the terms "circuits" and "circuitry" refer to physical electronic components (i.e. hardware) and any software and/or firmware ("code") which may configure the hardware, be executed by the hardware, and or otherwise be associated with the hardware. As used herein, for example, a particular processor and memory may comprise a first "circuit" when executing a first one or more lines of code and may comprise a second "circuit" when executing a second one or more lines of code. As utilized herein, "and/or" means any one or more of the items in the list joined by "and/or". As an example, "x and/or y" means any element of the three-element set {(x), (y), (x, y)}. In other words, "x and/or y" means "one or both of x and y". As another example, "x, y, and/or z" means any element of the seven-element set {(x), (y), (z), (x, y), (x, z), (y, z), (x, y, z)}. In other words, "x, y and/or z" means "one or more of x, y and z". As utilized herein, the term "exemplary" means serving as a non-limiting example, instance, or illustration. As utilized herein, the terms "e.g.," and "for example" set off lists of one or more non-limiting examples, instances, or illustrations. As utilized herein, circuitry is "operable" to perform a function whenever the circuitry comprises the necessary hardware and code (if any is necessary) to perform the function, regardless of whether performance of the function is disabled or not enabled (e.g., by a user-configurable setting, factory trim, etc.).

While the present method and/or system has been described with reference to certain implementations, it will be understood by those skilled in the art that various changes may be made and equivalents may be substituted without departing from the scope of the present method and/or system. In addition, many modifications may be made to adapt a particular situation or material to the teachings of the present disclosure without departing from its scope. For example, block and/or components of disclosed examples may be combined, divided, re-arranged, and/or otherwise modified. Therefore, the present method and/or system are not limited to the particular implementations disclosed. Instead, the present method and/or system will include all implementations falling within the scope of the appended claims, both literally and under the doctrine of equivalents.

What is claimed is:

1. A welding-type system, comprising:
   power conversion circuitry configured to convert input power to welding-type power;
   an interface configured to:
      receive a selection of a parameter from a plurality of parameters; and
      receive a selection of a value for the selected parameter; and
   control circuitry configured to:
      in response to the selection of the parameter from the plurality of parameters, control the interface to output a visual indication of an effect of changing the parameter on at least one of a shape of a tungsten welding electrode, a degradation of a tungsten welding electrode, a shape of a filler wire, a degradation of a filler wire condition, a shape of a stick electrode, a degradation of a stick electrode, a quantity of discontinuities in the weld, a magnitude of a discontinuity in the weld, or a quantity of inclusions in the weld;
      in response to a change in the value of the selected parameter via the interface, control the interface to change the visual indication of the effect based on the change in the value; and
      control the power conversion circuitry based on the value of the selected parameter.

2. The welding-type system as defined in claim 1, wherein the selected parameter is one of: a welding mode, a welding polarity, a tungsten electrode diameter, a tungsten electrode stickout length, a gas cup size, a shielding gas flow rate, a torch angle, an amperage setting, an AC balance, an AC frequency, a mixed AC-DC welding ratio, an AC waveshape, an AC commutation level, an EN amperage of an AC waveform, an EP amperage of the AC waveform, an amperage ratio of an AC waveform, a pulse frequency, a pulse peak phase time, a pulse background phase amperage, a pulse background percentage of a pulse cycle, a pulse waveform, a pulse transition rate, a pulse-on-pulse setting, or a pulse-on-pulse ratio.

3. The welding-type system as defined in claim 1, wherein the visual indication of the effect is based on one or more of: a material type of a workpiece being welded, a weld joint configuration, or a welding position.

4. The welding-type system as defined in claim 1, wherein the visual indication of the effect is based on one or more other parameters, different than the selected parameter.

5. The welding-type system as defined in claim 4, wherein the one or more other parameters comprise at least one of: the welding mode, the welding polarity, the tungsten electrode diameter, the tungsten electrode stickout length, the gas cup size, the shielding gas flow rate, the torch angle, an amperage setting, the AC balance, the AC frequency, the mixed AC-DC welding ratio, the AC waveshape, the AC commutation level, the EN amperage of the AC waveform, the EP amperage of the AC waveform, the amperage ratio of the AC waveform, the pulse frequency, the pulse peak phase time, the pulse background phase amperage, the pulse background percentage of the pulse cycle, the pulse waveform, the pulse transition rate, the pulse-on-pulse setting, or the pulse-on-pulse ratio.

6. The welding-type system as defined in claim 1, wherein the visual indication comprises a graphic.

7. The welding-type system as defined in claim 1, wherein the visual indication comprises text.

8. The welding-type system as defined in claim 1, wherein the selected parameter is one of a travel speed, a weave pattern, a travel angle, a work angle, a tungsten to work distance, a wire feed speed, a wire preheating power, a wire preheating voltage, a wire preheating current, a wire preheating enthalpy, a wire oscillation speed, a wire oscillation pattern, a wire feed location relative to a weld puddle, or a wire feed orientation relative to the weld puddle.

9. The welding-type system as defined in claim 1, wherein the control circuitry is configured to control the power conversion circuitry to output the welding-type power to have at least one of an alternating current (AC) waveform or a pulse waveform.

10. The welding-type system as defined in claim 1, wherein the interface comprises a remote interface in communication with the power supply.

11. A welding interface, comprising:
a display;
one or more input devices configured to:
receive a selection of a parameter from a plurality of parameters; and
receive a selection of a value for the selected parameter; and
control circuitry configured to:
in response to the selection of the parameter from the plurality of parameters, control the display to output a visual indication of an effect of changing the parameter on at least one of a shape of a tungsten welding electrode, a degradation of a tungsten welding electrode, a degradation of a tungsten welding electrode, a shape of a filler wire, a degradation of a filler wire condition, a shape of a stick electrode, a degradation of a stick electrode, a quantity of discontinuities in the weld, a magnitude of a discontinuity in the weld, or a quantity of inclusions in the weld; and
in response to a change in the value of the selected parameter via the one or more input devices, control the display to change the visual indication of the effect based on the change in the value.

12. The welding interface as defined in claim 11, wherein the selected parameter is one of: a welding mode, a welding polarity, a tungsten electrode diameter, a tungsten electrode stickout length, a gas cup size, a shielding gas flow rate, a torch angle, an amperage setting, an AC balance, an AC frequency, a mixed AC-DC welding ratio, an AC waveshape, an AC commutation level, an EN amperage of an AC waveform, an EP amperage of the AC waveform, an amperage ratio of an AC waveform, a pulse frequency, a pulse peak phase time, a pulse background phase amperage, a pulse background percentage of a pulse cycle, a pulse waveform, a pulse transition rate, a pulse-on-pulse setting, or a pulse-on-pulse ratio.

13. The welding interface as defined in claim 11, wherein the visual indication of the effect is based on one or more of: a material type of a workpiece being welded, a weld joint configuration, or a welding position.

14. The welding interface as defined in claim 11, wherein the visual indication of the effect is based on one or more other parameters, different than the selected parameter.

15. The welding interface as defined in claim 14, wherein the one or more other parameters comprise at least one of: the welding mode, the welding polarity, the tungsten electrode diameter, the tungsten electrode stickout length, the gas cup size, the shielding gas flow rate, the torch angle, an amperage setting, the AC balance, the AC frequency, the mixed AC-DC welding ratio, the AC waveshape, the AC commutation level, the EN amperage of the AC waveform, the EP amperage of the AC waveform, the amperage ratio of the AC waveform, the pulse frequency, the pulse peak phase time, the pulse background phase amperage, the pulse background percentage of the pulse cycle, the pulse waveform, the pulse transition rate, the pulse-on-pulse setting, or the pulse-on-pulse ratio.

16. The welding interface as defined in claim 11, wherein the visual indication comprises a graphic.

17. The welding interface as defined in claim 11, wherein the visual indication comprises text.

18. The welding interface as defined in claim 11, wherein the selected parameter is one of a travel speed, a weave pattern, a travel angle, a work angle, a tungsten to work distance, a wire feed speed, a wire preheating power, a wire preheating voltage, a wire preheating current, a wire preheating enthalpy, a wire oscillation speed, a wire oscillation pattern, a wire feed location relative to a weld puddle, or a wire feed orientation relative to the weld puddle.

19. The welding interface as defined in claim 11, further comprising a communications transceiver configured to transmit the value of the selected parameter to a welding power supply.

20. A method, comprising:
receiving a selection of a parameter from a plurality of parameters of the AC waveform or the pulse waveform;
in response to the selection of the parameter from the plurality of parameters, outputting a visual indication of an effect of changing the parameter on at least one of a shape of a tungsten welding electrode, a degradation of a tungsten welding electrode, a degradation of a tungsten welding electrode, a shape of a filler wire, a degradation of a filler wire condition, a shape of a stick electrode, a degradation of a stick electrode, a quantity of discontinuities in the weld, a magnitude of a discontinuity in the weld, or a quantity of inclusions in the weld;
receiving a change in a value for the selected parameter; and
in response to the change in the value of the selected parameter, change the visual indication of the effect based on the change in the value; and
controlling the power conversion circuitry to convert input power to welding-type power based on the value of the selected parameter.

* * * * *